DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED MAY 4, 1976

946 O.G. 8

T946,005
PRODUCTION OF SODIUM CARBONATE

William Dean Smith, Richard W. Waggener, and Gordon J. Huddleston, Green River, Wyo., assignors to Intermountain Research and Development Corporation

Continuation of application Ser. No. 393,975, Sept. 4, 1973. This application Mar. 21, 1975, Ser. No. 560,927
Int. Cl. C02o *7/00*
U.S. Cl. 423—206 T
1 Sheet Drawing. 23 Pages Specification

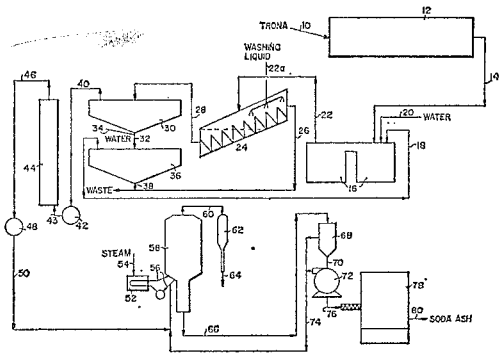

Method of preparing refined, dense soda ash from crude trona by calcining the crude trona to crude sodium carbonate, mixing the crude sodium carbonate with an aqueous solution of soda ash or water to form a substantially saturated crude sodium carbonate solution containing coarse and fine insolubles, separating the coarse solids from the crude sodium carbonate solution, washing the separated coarse solids to recover sodium carbonate values and returning these values to the crude sodium carbonate solution, clarifying the crude sodium carbonate solution, carbon treating the clarified sodium carbonate solution to remove organic impurities, evaporating the carbon-treated sodium carbonate solution to crystallize sodium carbonate monohydrate crystals, separating the sodium carbonate monohydrate crystals and calcining them to dense soda ash.

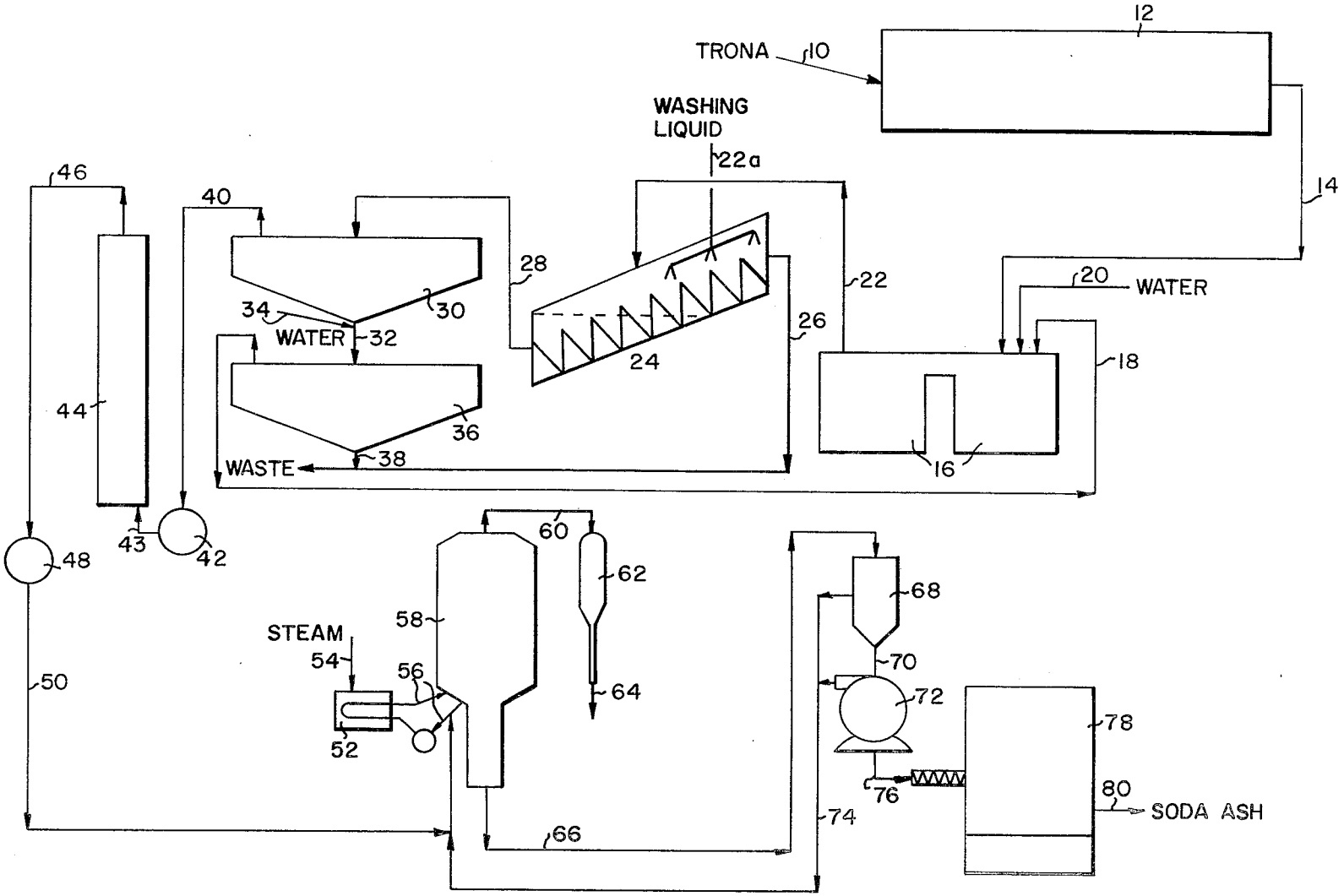

PRODUCTION OF SODIUM CARBONATE
Original Filed March 21, 1975